United States Patent [19]

Gansow et al.

[11] Patent Number: 4,704,411
[45] Date of Patent: Nov. 3, 1987

[54] PROCESS FOR PREPARING RIGID POLYURETHANE FOAMS

[75] Inventors: Michael A. P. Gansow; Omar B. Shadid, both of Terneuzen; Johannes E. G. Spork, St. Jansteen, all of Netherlands

[73] Assignee: The Dow Chemical Company, Midland, Mich.

[21] Appl. No.: 880,382

[22] Filed: Jun. 30, 1986

[51] Int. Cl.$^4$ .............................................. C08G 18/14
[52] U.S. Cl. ...................................... 521/166; 528/73
[58] Field of Search ........................... 521/166; 528/73

[56] References Cited

U.S. PATENT DOCUMENTS 3,221,016  11/1965  Currier et al. ...................... 521/167
3,251,787  5/1966   Bedoit ................................. 521/167
3,251,788  5/1966   Currier et al. ...................... 521/167

Primary Examiner—Maurice J. Welsh

[57] ABSTRACT

This invention is directed to a process by preparing a rigid polyurethane foam which comprise reacting a polyisocyanate with a polyol in the presence of a blowing agent, a polymerization catalyst and a surfactant. The polyol has the formula

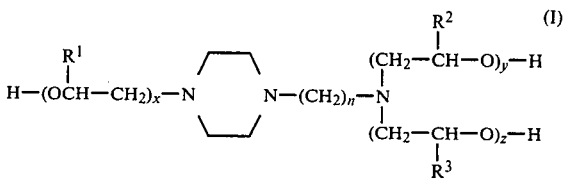

10 Claims, No Drawings

PROCESS FOR PREPARING RIGID POLYURETHANE FOAMS

This invention relates to the preparation of rigid polyurethane foams from polyisocyanates.

U.S. Pat. No. 3,251,787 discloses certain propoxylated derivatives of N-aminoethylpiperazine (AEP) having a degree of propoxylation of at least 6 propoxy units per mole. these propoxylated AEP derivatives are described as being useful in the preparation of flexible foam polyurethanes.

U.S. Pat. No. 3,221,016 discloses a propoxylated derivative of aminoethylpiperazine having three propoxy units per molecule. This derivative is described as being useful in preparing a rigid polyurethane foam (see, specifically, U.S. Pat. No. 3,251,788). However, the described AEP derivatine exhibits a significantly high viscosity.

The present invention is directed to a process for preparing a rigid polyurethane foam which comprises reacting a polyisocyanate with a polyol in the presence of a blowing agent, a polymerization catalyst and a surfactant, the polyol having the formula:

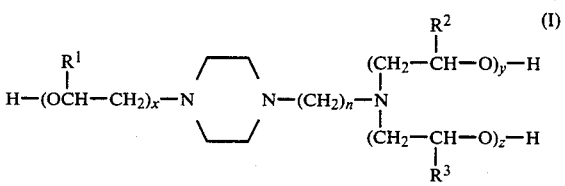

wherein $R^1$, $R^2$, and $R^3$ are, each independently, hydrogen, a $C_1$-$C_6$ alkyl group, optionally bearing one or more halogen, hydroxyl, optionally substituted phenyl, optionally substituted cycloalkyl, or optionally substituted phenyl ether substituents, n is 1 or 2, and $x+y+z$ is from about 3.5 to about 5.7.

When the polyol (I) is included in the polyol content of the starting material for rigid foam production, decreased amounts of polymerization catalyst are required, and/or reduced foaming (reaction) lines are exhibited compared to corresponding systems employing an alkylene amine-initiated polyol in place of the polyol of Formula (I). In addition, the resulting product shows a reduced degree of friability.

It has also unexpectedly been found that polyols of Formula (I) exhibit superior processability as compared to the AEP polyols described by U.S. Pat. No. 3,221,016, while still maintaining the necessary properties to prepare a rigid polyurethane foam.

The polyols of Formula (I) may be prepared easily by the reaction of a compound of the formula

wherein R is the same as $R^1$, $R^2$ and $R^3$ above, with aminoethyl or aminometylpiperazine.

Advantageously, the compound of Formula (I) may be preparted by initially preparing a pre-polyol in the absence of a catalyst, for example, by the techniques set forth in U.S. Pat. No. 3,221,016 until the aminoethylpiperazine is substituted with from 2.5 to 3 alkoxy groups per molecule. Subsequently, the propoxylated aminoethylpiperazine is further reacted with additional amounts of an alkylene oxide of Formula (II) in the presence of a basic catalyst to obtain an AEP derivative having the desired number of alkoxy groups per molecule. An alkali metal hydroxide such as potassium hydroxide is preferably employed as the catalyst.

The initial, uncatalyzed reaction between the alkylene oxide and the aminoethylpiperazine is advantageously conducted at a temperature of greater than 50° C., preferably from 80° to 160° C., more preferably from 80° to 120° C. and the catalytic reaction is preferably conducted at a temperature of from 110° to 150° C.

The initial, uncatalyzed reaction continues until the number of alkoxy groups substituted on the AEP reaches about three. Subsequently, in the presence of a basic catalyst, the reaction is substantially stoichiometric and proceeds essentially to completion with the average number of alkoxy units on each AEP molecule being dependent on the proportion of the starting materials. The amounts of the AEP and the alkylene oxide added to the reactor are selected accordingly.

ollowing reaction, it is advantageous to neutralize or remove the catalyst from the reaction product such as by the addition of acid or treatment with an ion exchange material or absorption by an inert material.

As mentioned above, the group R in Formula (II) may be a group as defined for $R^1$, $R^2$ or $R^3$ above. However, it is preferred that the compound of Formula (II) is ethylene oxide or porpylene oxide, in which case, $R^1$, $R^2$ and $R^3$ in the said Formula (I) are each hydrogen or methyl respectively. In the said Formula (I), $x+y+z$ preferably amount to from 3.5 to 5.5, more preferably from 3.5 to 5, these figures corresponding to the stoichiometric ratio of the starting ingredients in the preparation of the compound of Formula (I).

The polyol according to the invention may be formulated with one or more additives, for example an additional polyol component, a blowing agent, a surfactant, or a fire retardant additive, and/or with a polyisocyanate, to form a novel precursor composition for the production of rigid polyurethane foams.

A second aspect of the invention is a precursor composition for use in the preparation of a rigid polyurethane foam, which composition comprises a polyol of the Formula (I) above, together with at least one rigid polyurethane foam ingredient, selected from the group consisting of:
(i) an additional polyol component,
(ii) a blowing agent,
(iii) a surfactant,
(iv) a fire retardant additive, and
(v) a polyisocyanate.

When the additional rigid polyurethane foam ingredient of the precursor composition is a polyisocyanate, the precursor composition will generally be short-lived, and will be formed only immediately prior to the production of the desired polyurethane foam. However, when the additional component of the precursor composition of an additional polyol, a blowing agent, a surfactant, a catalyst, or a fire retardant, the precursor composition may be stored and sold, for example as a component of a two component polyurethane system for later mixing with a polyisocyanate.

Any one of a variety of additional polyols may be used in conjuction with the polyol of the Formula (I) above. Suitable examples are hydroxy-terminated polyesters, polyether-polyols, polyoxyethyleneamines, glycerine and mixtures of two or more thereof. All these polyols are conventionally used in the preparation of polyurethane foams. The amount of the polyol of Formula (I) to be employed may be from 1 to 100 parts by weight preferably about 20–100, per 100 parts by weight of the total polyol contact of the mixture.

The rigid polyurethane foam is generally prepared by reacting the polyisocyanate component with the polyol component in the presence of a blowing agent, polymerization catalyst, and a surfactant. The blowing agent, polymerization catalyst and surfactant used herein can be any conventional blowing agent, polymerization catalyst and surfactant useful in the preparation of a rigid polyurethane foam.

Examples of suitable blowing agents are halogen substituted aliphatic hydrocarbons, with a boiling point between −40° and 7020 C., which vaporize at or below the temperature of the foaming mass. Examples of such compounds are trichloromonofluoromethane, dichlorodifluromethane, dichloromethane, bromotrifluoromethane, or trichloromonofluoromethane. Water may additionally or alternatively be utilized.

The blowing agent may be used in an amount of from 1 to 50, perferably from 30 to 50 parts by weight, per 100 by weight of the total polyol content of the reaction mixture.

The surfactant which may be used in the method and composition of the invention may be any surfactant conventionally used in the production of polyurethane foams, and in particular any surfactants conventionally used for the regulation of cell size. Examples of such surfactants are the sodium salt of a castor oil sulphonate, a sodium salt of a fatty acid, a salt of a fatty acid with an amine, an alkali metal or ammonium salt of a sulphonic acid, a water-soluble polyether siloxane, or a mixture of two or more thereof.

The surfactant is preferably used in an amount of from 0.01 to 5 parts by weight, preferably from 0.5 to 1.5 parts by weight, per 100 parts by weight of the total polyol content of the reaction mixture.

The catalyst which may be used in the method and composition of the invention may be any conventional catalyst for this purpose, for example, a tertiary amine, such as triethanolamine, N-methylmorpholine, triethylene diamine, N,N,N,N-tertramethylethylenediamine, N-methyl-N-dimethylaminoethylpiperazine, 2-methyl imidazole, triisopropanolamine; or diethanolamine; an organometallic compound such as organometallic acetate or octoate, or a trimerization catalyst, for example an alkali metal salt of a carboxylic acid, or a non-basic metal salt of a carboxylic acid. The catalyst is preferably used in an amount of from 0 to 15, preferably from 0 to 5 parts by weight, per 100 parts by weight of the total polyol content.

Any conventional fire retardant additive, for example styrene oxide, an epihalohydrin, tris(dichloropropyl) phosphate, triethylphosphate, a phosphorous containing polyol, or a mixture of two or more thereof may be utilized. The fire retardant additive is preferably used in an amount from 0 to 40, more preferably from 5 to 15 parts by weight, per 100 parts by weight of the total polyol.

The isocyanate used in the invention may be any aromatic or aliphatic polyisocyanate, for example a polymethylene polyphenylisocyanate, 2,4-toluene diisocyanate, 2,6-toluene diisocyanate, xylene 1,4-diisocyanate, or a mixture of two or more thereof. The amount of the polyisocyanate is preferably such as to provide a small excess, for example a 5 percent stoichiometric excess, of the isocyanate with respect to the total polyol.

The aminoalkylpiperazine-initiated polyol of this invention is particularly useful in the preparation of molded, pour-in-place rigid polyurethane foam. Such foams are commonly used as thermal insulation in refrigerators, freezers, coolers, insulated bottles and similar articles. In preparing such articles, a rigid polyurethane foam-forming composition is poured into an empty space enclosed by the walls of the article. During the pouring of the composition, and its subsequent curing, the article is held in the desired configuration by use of a jig. If the jig is released prematurely, the further expansion of the foam formulation causes the article to become distorted. Since the availability of these jigs usually determines the rate of production of these articles, a shorter cure cycle results directly in increased production rate.

The use of an aminoalkylpiperazine-initiated polyol as described herein as the sole or a significant proportion of the polyol(s) used in the rigid polyurethane foam-forming composition provides a particularly rapid cure. The cure rate for molded, rigid polyurethane foams in conveniently measured by injecting the formulation into a mold, permitting it to cure for a predetermined period, and then releasing the pressure on the mold. If curing is incomplete, the molded polyurethane foam will expand somewhat after the pressure is released. Cure rate is then measured in one of two ways. The time required so that no demold expansion of the foam occurs can be used as a measure of the cure rate, with lesser times indicating a faster cure. More typically, however, industrial prycesses can tolerate a certain amount of demold expansion. In these processes, it is common practice to employ the shortest demold time at which a tolerable amount of demold expansion occurs. Accordingly, cure rate can be determined indirectly by applying pressure to the mold for a predetermined period of time which is less than that required for complete cure, and then measuring the amount of demold expansion which occurs. Smaller demold expansions indicate faster cures. Preferably, the rigid foam formulation exhibits a demold expansion of less than about 0.2", preferably less than about 0.1", most preferably less than about 0.07" when cured for four minutes at room temperature in a 200×20×5 cm mold. Alternatively, the formulation provides a tolerable demold expansion at a cure time of four minutes or less, preferably about 3.5 minutes or less, more preferably about 3.0 minutes or less. As mentioned before, such cure rates are achieved when the sole polyol employed in the formulation is the aminoalkylpiperazine-initiated polyol described herein, or when such aminoalkyl piperazine-initiated polyol constitutes a significant portion (at least about 20, preferably at least about 40 weight percent) of the polyol(s) employed.

In addition to rapid cures, molded, rigid polyurethane foam formulations containing the aminoalkylpiperazine-initiated polyol also exhibit good compressive strengths, k-factors, flowability (ability to fill a mold) and non-shrink densities.

A number of preferred embodiments of the invention will now be described, with reference to the following examples.

Polyol Preparation I

(Preparation of propoxylated piperazine polyol)

A compound of the Formula (I) was prepared by the following method. Propylene oxide was slowly added to 2.2 liters of aminoethyl piperazine (AEP) in a 10 liter reactor at 90° C. The amount of propylene oxide added was such as to provide a molar ratio of 2.9 propylene oxide units, per mole of piperazine, and the temperature of the reaction mixture was maintained at approximately 120° C. during the addition of the propylene oxide and for two hours after the addition was complete.

Subsequently, 6 grams of potassium hydroxide were added and the reaction mixture was heated to 130° C. At this time, an additional amount of propylene oxide was added to the reactor to provide an overall molar ratio of 4.0 propylene oxide units per AEP molecule. When the addition was complete, the reaction mixture was maintained at 130° C. for 5 hours. The potassium hydroxide was then neutralized and the propoxylated AEP recovered.

The low boiling materials were then removed by stripping under vacuum. The hydroxyl number, viscosity, and water content of the sample were measured, and found to be as follows:
Hydroxyl Percent: 14.8
Viscosity, at 25° C.: 14,000 centistokes (0.0140 m²/s)
Water Content: 500 ppm The NMR spectrum of the sample was also investigated, and found to be consistent with the structure given above in Formula (I).

Comparative Polyol Preparation

An AEP initiated polyol was prepared by slowly adding propylene oxide to 2.2 liters of aminoethyl piperazine in a 10 liter reactor at 90° C. The amount of propylene oxide added was such as to provide a molar ratio of 3.0 propylene oxide units per mole of pPiperazine. The temperature of the reaction mixture was maintained at approximately 120° C. during the addition of the propylene oxide and for two hours after the addition was complete.

The resplting product is the polyol described in U.S. Pat. No. 3,221,016. The properties of the polyol were examined as in Preparation 1 and found to be as follows:
Hydroxyl Percent: 16.7
Viscosity, at 25° C.: 22,500 centistokes (0.0225 m²/s)
Water Content: 500 ppm

EXAMPLES 1 TO 4

Rigid polyurethane foams were prepared from the product of polyol Preparation 1. The foams were prepared by the initial preparation of a precursor composition containing all the ingredients except the isocyanate, and the isocyanate was finally added, and the mixture stirred for 8 to 10 seconds. The mixture was poured into 20×20×20 cm cardboard boxes, and the resulting foam was cured at room temperature for 24 hours.

The cream time, gel time, tack free time, friability, and free-rise density of the resulting foams were measured. The components of the foam mistures are shown in Table 1, and the properties of the resulting foams in Table 2.

Tables 1 and 2 also show as Comparative Example 1 a similar composition in which no polyol of Formula (I) was used.

As can be seen from Table 2, the cream time, gel time, and tack free time of the compositions in which the polyol I was used were substantially shorter than those of Comparative Example 1, and the performance of the resulting product in the abrasion test (indicative of the friability of the product) was also significantly improved.

EXAMPLE 5

Preparation 1 was repeated, except that the amount of propylene oxide added in the second stage was such as to provide a propyleneoxy content of 5.7 units per mole in the resulting polyol. The properties of the polyol were examined as in Preparation 1, and found to be as follows:
Hydroxyl Percent: 11.1
Viscosity, at 25° C.: 5500 centistokes (0.0055 m²/s)
Water Content: 550 ppm
A rigid polyurethane foam was prepared from the thus-prepared polyol.

TABLE 1

|  | Exam. 1 | Exam. 2 | Exam. 3 | Exam. 4 | Com. Ex. 1 |
|---|---|---|---|---|---|
| Sugar/glycerine-initiated polyol[1] | 44 | 44 | 44 | 44 | 44 |
| Amine initiated polyol[2] | — | — | 20 | — | 40 |
| Product of Preparation I | 40 | 40 | 20 | 20 | — |
| Propoxylated DETA[3] | — | — | — | 20 | — |
| Tertiary Amine Catalyst[4] | 1.0 | 0.0 | 1.0 | 1.0 | 1.0 |
| Glycerine | 4.0 | 4.0 | 4.0 | 4.0 | 4.0 |
| Silicone Surfactant[5] | 1.0 | 1.0 | 1.0 | 1.0 | 1.0 |
| Water | 1.0 | 1.0 | 1.0 | 1.0 | 1.0 |
| Freon-11 (Trade Mark) | 35 | 35 | 35 | 35 | 35 |
| Methylene diphenyl diisocyanate | 150 | 150 | 150 | 150 | 150 |

All parts shown are by weight
[1] sugar/glycerine-initiated polyoxypropylene polyol having a hydroxyl number of 411.
[2] Ethylenediamine-initiated propylene oxide adduct having a hydroxyl number of 460.
[3] Diethylenetriamine-initiated polyol having a degree of propoxylation of about 5 propoxy units per mole.
[4] N,N—dimethylcyclohexylamine.
[5] Rhodorsil RH-21609.

TABLE 2

|  | Exam. 1 | Exam. 2 | Exam. 3 | Exam. 4 | Com. Ex. 1 |
|---|---|---|---|---|---|
| Cream Time (sec) | 10 | 12/13 | 17 | 15/16 | 23 |
| Gel Time (sec) | 26 | 34 | 55 | 41 | 64 |
| Tack Free Time (sec) | 32 | 43 | 66 | 52 | 77 |
| % Abrasion | 3.0 | 2.7 | 6.8 | 6.5 | 14.2 |
| Free Rise Density kg/m³ | N.M. | N.M. | 27 | 28 | 27.9 |
| Compressive Strength (kPa) | N.M. | N.M. | 213 | 215 | 206 |

*N.M. - not measured

We claim:

1. A process for preparing a rigid polyurethane foam which comprises reacting a polyisocyanate with a polyol in the presence of a blowing agent, a polymerization catalyst and a surfactant, the polyol having the formula:

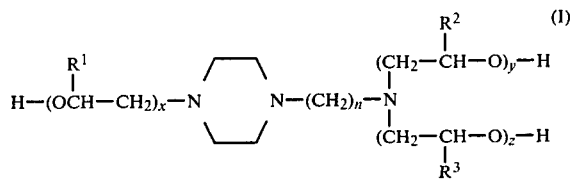

wherein $R^1$, $R^2$, and $R^3$ are, each independently, hydrogen, a $C_1$-$C_6$ alkyl group, optionally bearing one or more halogen, hydroxyl, optionally substituted phenyl, optionally substituted cycloalkyl, or optionally substituted phenyl ether substituents, n is 1 or 2, and $x+y+z$ is from about 3.5 to about 5.7.

2. The process as claimed in claim 1, wherein n in the said Formula (I) is 2.

3. The process as claimed in claim 1, wherein $R^1$, $R^2$ and $R^3$ in the Formula (I) are each independently hydrogen or methyl.

4. The process as claimed in claim 3, wherein the said polyol of Formula (I) is preparted by the reaction of aminoethylpiperazine with propylene oxide.

5. The process as claimed in claim 1, wherein $x+y+z$ in Formula (I) is from 3.5 to 5.5.

6. A method as claimed in claim 5, wherein $x+y+z$ is from 3.5 to 5.

7. A method as claimed in claim 1, wherein an additional polyol is present in the reaction mixture.

8. A method as claimed in claim 7, wherein the additional polyol is a hydroxy-terminated polyester, a polyether polyol, glycerine, a polyoxyalkyleneamine, or a mixture of two or more thereof.

9. A method as claimed in claim 8, wherein the amount of the additional polyol is from 0 to 99 parts by weight, per 100 parts by weight of the total polyol content of the reaction mixture.

10. A precursor composition for use in the preparation of a rigid polyurethane foam, which composition comprises a polyol of the formula:

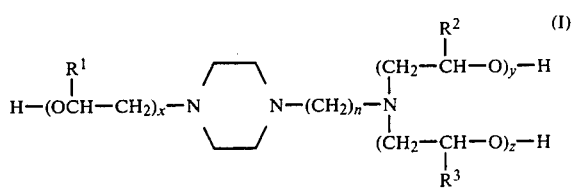

wherein $R^1$, $R^2$, and $R^3$ are, each independently, hydrogen, a $C_1$-$C_6$ alkyl group, bearing one or more halogen, hydroxyl, optionally substituted phenyl, optionally substituted cycloalkyl, or optionally substituted phenyl ether substituents, n is 1 or 2, and $x+y+z$ is from about 3.5 to about 5.7, together with at least one rigid polyurethane foam ingredient, selected from the group consisting of:

(i) an additional polyol component,
(ii) a blowing agent,
(iii) a surfactant,
(iv) a fire retardant, and
(v) a polyisocyanate.

* * * * *